May 8, 1928.
D. M. STRENGBERG
CAN OPENER
Filed Dec. 13, 1927
1,669,311
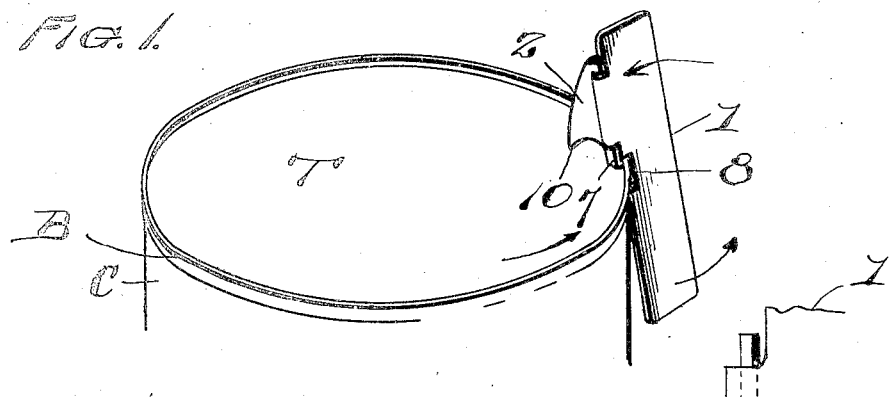
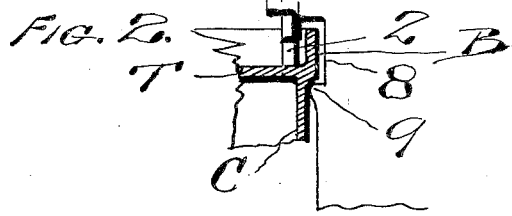
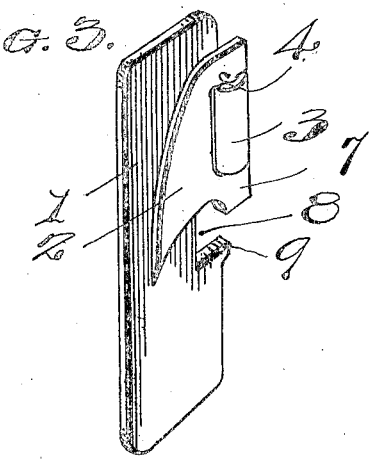
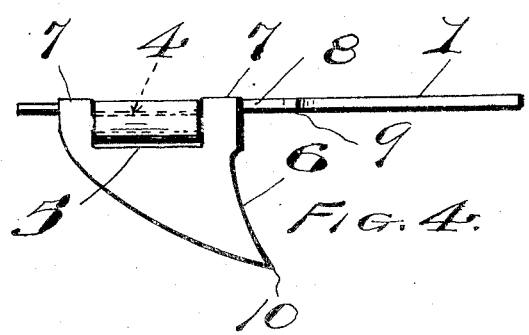
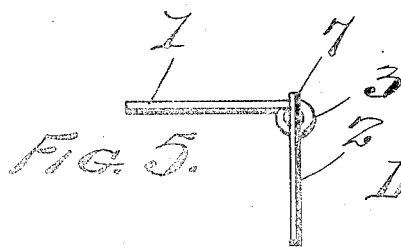
Dewey M. Strengberg.
Inventor
By Thomas R. Harvey
Attorney Patented May 8, 1928.

1,669,311

UNITED STATES PATENT OFFICE.

DEWEY M. STRENGBERG, OF ISHPEMING, MICHIGAN, ASSIGNOR OF ONE-HALF TO WILLIAM J. WALTERS, OF ISHPEMING, MICHIGAN.

CAN OPENER.

Application filed December 13, 1927. Serial No. 239,711.

My present invention relates to an improved can opener which while adapted for domestic use is especially designed for use as a portable device by tourists, campers, excursionists, and others. The implement includes essentially a handle portion and a foldable blade and the latter is provided with a cutting edge and insertion point, in order that the blade or cutter may be folded compactly on the handle and the implement thus carried in the pocket, or in other receptacle where it is readily accessible for use. The blade is readily unfolded and the cutter may quickly be put into use and manipulated by the right hand while the left hand holds and turns the can to meet the cutting blade as the cutting proceeds and the can is opened.

The invention consists in certain novel combinations and arrangements of parts involving a flat handle and its foldable, flat, cutting blade, and co-acting elements on the handle and blade as will hereinafter be more fully pointed out and claimed.

In the accompanying drawings I have illustrated one complete example of the physical embodiment of my invention wherein the parts are combined and arranged according to the best mode I have thus far devised for the practical application of the principles of my invention.

Figure 1 is a perspective view illustrating the can opener in position for use, and indicating by the arrows the movements of the implement and of the can Figure 2 is an enlarged detail view showing in section a portion of a can and its lid or top and indicating the relation of the implement to the rim of the can-top.

Figure 3 is a perspective view of the folded device in position for storage, and when not in use.

Figure 4 is an edge view of the device with the blade unfolded.

Figure 5 is an edge view of the device showing the manner of bracing the cutting blade against the edge of the handle.

In order that the general relation and utility of parts may readily be understood I have indicated in Figure 1 a part of a can C with a bead or rim B and top or lid T as usual, and the arrow on the can top or lid indicates the direction of movement (anti-clockwise) in which the can is turned by the left hand when the lid T is being cut to open the can.

The essential parts of the implement are the handle 1, which is here shown as fashioned from a flat metal plate with rounded corners, and of size to permit it to be held and manipulated in and by the thumb and first two fingers of the right hand, the thumb being located at the upper end of the handle to push down in the direction of the arrow, and the second finger is placed under the lower end of the plate to swing this end upwardly as indicated by the arrow, the first finger being used under the upper end of the plate beneath the thumb. The plate or handle 1 is of suitable length and may be made to accommodate the points or ends of all four fingers of the right hand, at its under side, while the thumb is used on the upper side, at the upper end of the plate or handle to manipulate the implement.

The cutting blade 2 is also fashioned of thin, plate metal and it is hinged to the hinge-sleeve 3 that is formed integral with the plate 1, at one edge thereof. The blade is provided with a hinge pin 4 that is fashioned as one wall of a slot 5 and the pin is surrounded by the hinge sleeve to permit the blade to swing around flat against the plate as in Figure 3 or to swing out at right angles to the plane of the flat plate when desired for use, as in Figures 1, 4 and 5.

The cutting blade is fashioned with a curved cutting edge 6 and a pair of angular lugs or braces 7, 7, and the handle-plate is provided with an edge notch 8 and lug 9 adapted to coact with the rim or bead B of the can as indicated in Figure 2.

The cutting blade operates from the point 10 along its cutting edge to cut a smooth, clean kerf in the top or lid of the can, and the point of course is also used to penetrate the metal of the lid preparatory to the cutting operation.

With implement in the position shown in Figure 1 and with the point 10 in proper position, which may be close to the rim or spaced therefrom as desired, pressure applied by the thumb of the right hand in the direction of the upper arrow in Figure 1 causes the point 10 to be pushed into the metal of the lid or top, the edge 6 following the point and cutting its way through the metal as the upper end of the plate swings over on its down stroke. It will be noted that the plate or handle 1 is held close against the side of the can and the notch 8 in the edge of the plate is slipped over the rim at the top of the can, while the guide lug 9 fits up against the lower outer edge or ridge of the rim.

The lower brace lug 7 of the cutting blade is positioned within the rim as indicated in Figure 2 and the plate is guided as it is oscillated on the notched part of the plate co-acting with the rim as a center or fulcrum, and the implement held in proper position as the can is swung in the direction of the arrow in Figure 1. The down stroke of the upper part of the plate 1 is the cutting stroke and the cutting edge 6 rides down through the metal in the kerf from the point 10 toward the lower brace lug 7, and after the down stroke, of course, the plate and blade are oscillated in the reverse direction on the idle stroke. The repetition of this oscillating movement of the implement together with the intermittent turning of the can accomplishes the opening of the can to the extent desired.

As seen in Figure 5 the brace lugs 7 are turned and held flat against the edge of the handle plate 1 and the pressure of the fingers and thumb is applied to the implement in such manner as to hold the blade and plate at right angles and to prevent accidental folding movement of the blade.

A clean cut or kerf is fashioned by the cutting edge, without the usual ragged edge that is dangerous, and the oscillating movement imparted to the plate and cutting blade may be accomplished with facility and with the expenditure of comparatively little strength. The implement is fashioned of a minimum number of parts to provide a folding blade and the parts may be readily stamped, pressed or otherwise formed, and then assembled with facility, and the implement operated with convenience.

Having thus fully described my invention, what I claim as new and desire to secure by Letters Patent is:

1. The combination with a flat handle, of a foldable cutting blade hinged thereto, and brace lugs on the blade one of which is adapted for co-action with the handle to hold the latter on a can in angular, operative position.

2. The combination with a handle plate having a hinge sleeve and a guide notch at one edge, of a foldable cutting blade having a slot and hinge pin in the sleeve, and brace lugs on the back edge of the cutting blade one of which is adapted for co-action with the edge of the plate to hold the blade on a can in angular operative position 3. The combination with a handle plate having a hinge sleeve and an edge notch and guide lug, of a cutting blade having a slot and hinge pin, and spaced brace lugs on the back edge of the cutting blade one of which is adapted for co-action with the edge of the plate for holding the blade in operative position on a can.

In testimony whereof I have affixed my signature.

DEWEY M. STRENGBERG.